(12) United States Patent
Tacchi et al.

(10) Patent No.: US 9,436,760 B1
(45) Date of Patent: Sep. 6, 2016

(54) MEASURING ACCURACY OF SEMANTIC GRAPHS WITH EXOGENOUS DATASETS

(71) Applicant: Quid, Inc., San Francisco, CA (US)

(72) Inventors: Ruggero Altair Tacchi, San Francisco, CA (US); Fabio Ciulla, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 0 days.

(21) Appl. No.: 15/016,693

(22) Filed: Feb. 5, 2016

(51) Int. Cl.
 G06F 7/00 (2006.01)
 G06F 17/30 (2006.01)
 G06F 17/27 (2006.01)
 G06N 99/00 (2010.01)

(52) U.S. Cl.
 CPC ....... *G06F 17/30684* (2013.01); *G06F 17/277* (2013.01); *G06F 17/279* (2013.01); *G06F 17/3071* (2013.01); *G06F 17/30646* (2013.01); *G06F 17/30734* (2013.01); *G06N 99/005* (2013.01)

(58) Field of Classification Search
 CPC .................... G06F 17/2785; G06F 17/30958; G06F 17/30663
 USPC .......................................................... 707/776
 See application file for complete search history.

(56) References Cited

U.S. PATENT DOCUMENTS

| | | | | |
|---|---|---|---|---|
| 6,862,731 | B1 * | 3/2005 | Roth ..................... | G06F 9/5066 709/226 |
| 9,088,598 | B1 * | 7/2015 | Zhang ................. | H04L 63/1408 |
| 9,183,387 | B1 * | 11/2015 | Altman ................ | G06F 21/554 |
| 2004/0093328 | A1 * | 5/2004 | Damle ................ | G06F 17/2785 |
| 2004/0254749 | A1 * | 12/2004 | Kageura ............... | G01R 31/12 702/59 |
| 2005/0041676 | A1 * | 2/2005 | Weinstein .............. | H04L 45/02 370/401 |
| 2005/0278325 | A1 * | 12/2005 | Mihalcea .............. | G06F 17/277 |
| 2007/0086358 | A1 * | 4/2007 | Thubert ................. | H04L 45/12 370/254 |
| 2009/0024385 | A1 * | 1/2009 | Hirsch ................ | G06F 17/2785 704/9 |
| 2009/0055628 | A1 * | 2/2009 | Mitran .................. | G06F 9/3834 712/207 |
| 2009/0133006 | A1 * | 5/2009 | Cheung .................... | G06F 8/71 717/144 |
| 2011/0179084 | A1 * | 7/2011 | Waddington ........... | G06Q 30/02 707/794 |
| 2011/0202526 | A1 * | 8/2011 | Lee .................... | G06F 17/30684 707/726 |
| 2013/0246315 | A1 * | 9/2013 | Joshi ........................ | G06N 5/04 706/10 |
| 2013/0318012 | A1 | 11/2013 | Huang et al. | |
| 2013/0339005 | A1 | 12/2013 | Zhang | |

(Continued)

OTHER PUBLICATIONS

An Overview of the Sparse Basic Linear Algebra Subprograms: The New Standard from the BLAS Technical Forum', ACM Transactions on Mathematical Software, vol. 28, No. 2, Jun. 2002, pp. 239 to 267.

(Continued)

*Primary Examiner* — Binh V Ho

(74) *Attorney, Agent, or Firm* — Pillsbury Winthrop Shaw Pittman LLP

(57) ABSTRACT

Provided is a process including: obtaining a semantic similarity graph having nodes corresponding to documents in an analyzed corpus and edges indicating semantic similarity between pairs of the documents; for at least a plurality of nodes in the graph, evaluating accuracy of the edges based on neighboring nodes and an external corpus by performing operations including: identifying the neighboring nodes based on adjacency to the respective node in the graph; selecting documents from an external corpus based on references in the selected documents to entities mentioned in the documents of the neighboring nodes; and determining how semantically similar the respective node is to the selected documents.

32 Claims, 3 Drawing Sheets

(56) References Cited

U.S. PATENT DOCUMENTS

| | | | |
|---|---|---|---|
| 2014/0086497 A1* | 3/2014 | Fei-Fei | G06K 9/00369 382/224 |
| 2014/0096249 A1* | 4/2014 | Dupont | G06F 21/00 726/23 |
| 2014/0214858 A1* | 7/2014 | Ozonat | G06F 17/30731 707/748 |
| 2014/0229160 A1 | 8/2014 | Galle | |
| 2014/0229161 A1* | 8/2014 | Gliozzo | G06F 17/2785 704/9 |
| 2014/0279837 A1 | 9/2014 | Guo et al. | |
| 2014/0280224 A1* | 9/2014 | Feinberg | G06F 17/30958 707/748 |
| 2014/0351267 A1* | 11/2014 | Kumar | G06F 17/30663 707/748 |
| 2015/0269139 A1* | 9/2015 | McAteer | G06F 17/30734 704/9 |
| 2015/0356202 A1* | 12/2015 | Yampolska | G06Q 30/02 707/755 |
| 2015/0379428 A1 | 12/2015 | Dirac et al. | |
| 2015/0379429 A1 | 12/2015 | Lee et al. | |

OTHER PUBLICATIONS

Chapter 3: Sparse BLAS', http://www.netlib.org/blas/blast-forum/chapter3.pdf, Aug. 21, 2001, pp. 104 to 131.

Cross-Validation for Unsupervised Learning', Patrick O. Perry, A Dissertation Submitted to the Department of Statistics and the Committee on Graduate Studies of Stanford University, Sep. 16, 2009, pp. 1 to 165.

An Overview of Cache Optimization Techniques and Cache-Aware Numerical Algorithms', http://www.cc.gatech.edu/~bader/COURSES/UNM/ece637-Fa112003/papers/KW03.pdf, Fall 2003, pp. 1 to 23.

Optimizing for the Serial Processors', http://www.slideserve.com/liam/optimizing-for-the-serial-processors, May 30, 2013, pp. 1 to 49.

The Cache Performance and Optimizations of Blocked Algorithms', ACM SIGARCH Computer Architecture News, vol. 19 INo. 2, Apr. 1991, pp. 63 to 74.

The Science of Programming Matrix Computations', Copyright 2008 by Robert A. van de Geijn and Enrique S. Quintana-Ort', pp. 1 to 140.

* cited by examiner

US 9,436,760 B1

MEASURING ACCURACY OF SEMANTIC GRAPHS WITH EXOGENOUS DATASETS

BACKGROUND

1. Field

The present invention relates generally to computational linguistics and, more specifically, to measuring accuracy with exogenous datasets of graphs formed with unsupervised learning techniques.

2. Description of the Related Art

Often people wish to draw inferences based on information contained in, and distributed among, relatively large collections of documents, e.g., substantially more documents than they have time to read or the cognitive capacity to analyze. Certain types of inferences implicate relationships between those documents. For example, it may be useful to organize documents by the subject matter described in the documents, sentiments expressed in the documents, or topics addressed in the documents. In many cases, useful insights can be derived from such organization, for example, discovering taxonomies, ontologies, relationships, or trends that emerge from the analysis. Examples might include organizing restaurants based on restaurant reviews, organizing companies based on content in company websites, organizing current events or public figures based on new stories, and organizing movies based on dialogue.

One family of techniques for making such inferences is computational linguistic analysis of text, such as unstructured text, within the documents of a corpus, e.g., with natural language processing techniques, like those based on distributional semantics. Computers are often used to perform semantic similarity analyses within corpora to gauge document pair-wise similarity of the documents according to various metrics, or pair-wise measures of relationships between entities, topics, terms, or sentiments discussed in the documents, which may be crafted to yield results like those described above. Through the sophisticated use of computers, inferences that would otherwise be impractical are potentially attainable, even on relatively large collections of documents.

In many cases, the collections of documents are relatively large, for example, more than 100 documents, and in many cases more than 10,000 documents, making it difficult to gauge whether computer-implemented analyses are accurate. For instance, an algorithm may work well for certain classes of topics or documents within the corpus, but other classes of topics or documents may yield low-quality results. Further time and cognitive limitations make it difficult for a human being to effectively manually review each of the documents and compare that document to the algorithm's assessment, causing many analyses relying solely on human review to lead to false conclusions or misleading results, and making it difficult to compare the performance of algorithms.

SUMMARY

The following is a non-exhaustive listing of some aspects of the present techniques. These and other aspects are described in the following disclosure.

Some aspects include a process including: obtaining a semantic similarity graph having nodes corresponding to documents in an analyzed corpus and edges indicating semantic similarity between pairs of the documents; for at least a plurality of nodes in the graph, evaluating accuracy of the edges based on neighboring nodes and an external corpus by performing operations including: identifying the neighboring nodes based on adjacency to the respective node in the graph; selecting documents from an external corpus based on a references in the selected documents to entities mentioned in the documents of the neighboring nodes; and determining how semantically similar the respective node is to the selected documents.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
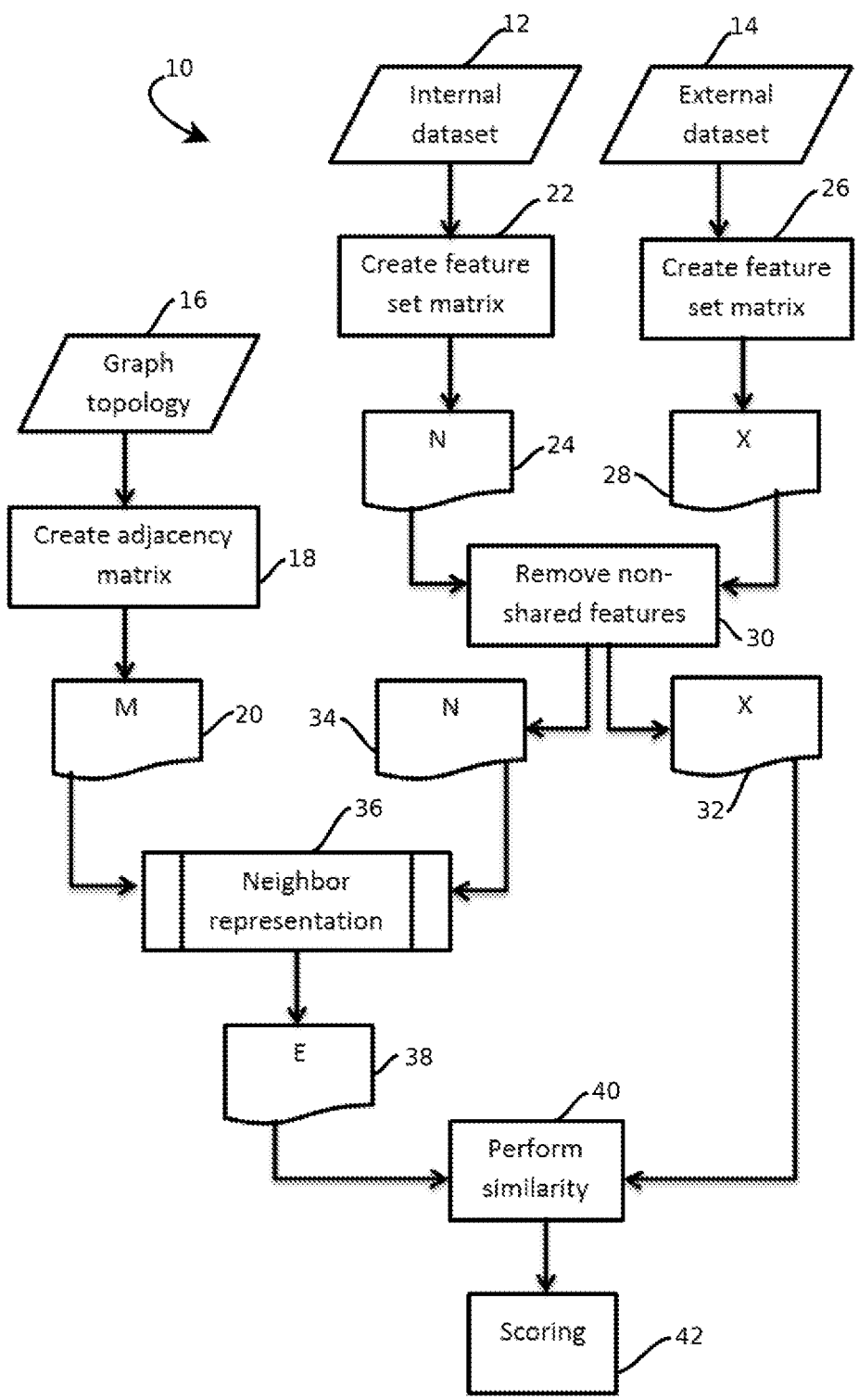
FIG. 1 is a flow chart of an example of a process of measuring accuracy of a computational linguistics analysis.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some cases, computational linguistic analysis of a collection of documents (or other analyzed corpus) may yield a semantic graph (or other type of graph, like those described below) of documents, where edges are given by pairwise semantic similarities between each couples of documents in the corpus. Various machine learning techniques may be used to generate this kind of graph, and examples are described below. Generally, there is a lack of methods to assess their performance, particularly for unsupervised machine learning techniques (which is not to suggest that the techniques described herein may not also be applied to supervised machine learning models).

The challenge noted above of measuring accuracy is particularly acute for analyses performed by unsupervised learning algorithms. Many supervised-learning techniques for quality assessment, like cross-validation, are generally not well suited for unsupervised learning algorithms. In cross-validation, a portion of a labeled training set is generally withheld when training a supervised learning model. Later, the withheld data is typically applied to the trained algorithm to measure the algorithm's performance against the withheld data, often by comparing model output to the labels in the training data. Unsupervised learning techniques, however, are generally not based on a training set. Lacking a training set, for unsupervised techniques, there is generally no readily identified data to be withheld for measuring accuracy, nor a readily discernable mechanism for testing results against other data.

To mitigate this problem, or other problems discussed below, some embodiments provide a scoring system that leverages exogenous information in order to quantify the quality (e.g., accuracy) of a semantic graph. The use of an external source that provides an alternative description of the documents is expected to provide a powerful method of measuring accuracy of the graph, because the process may rely, at least in part, on a different dataset to avoid self-consistent misleading evaluation. Further, the technique may be extended to other types of graphs, as discussed below.

Certain techniques below are expected to be particularly relevant for similarity graphs, though other types of semantic graphs are also expected to benefit. In an accurate similarity graph, a node should be connected to its most similar nodes. So, with such a graph, the identity of a single node is expected to be predictable from information gathered from its neighborhood of adjacent nodes. To this end or others, some embodiments collect information about the connectivity around single documents (corresponding to nodes in the semantic graph) and create an endogenous representation of the documents based on the nodes in their neighborhood (e.g., sharing an edge with the node). Some embodiments may then use validated information about the entities that the documents represent from exogenous informed sources, such as individuals, crowd sourcing, or open source material (e.g., Wikipedia™ pages about the entities). At this stage, some embodiments may have two representations for each entity, one provided by the combined effect of graph structure and endogenous dataset and the other given by the exogenous sources. From the comparison of these two sets of representations, some embodiments compute how accurately the identity of each node is predicted starting from the endogenous and network structural information. Finally, in some embodiments, the quality of the entire network (or a sampled subset thereof) may be calculated as an aggregated measure of the prediction for the nodes (e.g., for all or a sample). Further, some embodiments may undertake these processes in a particular fashion that scales to relatively large graph sizes by improving upon the functioning of computer systems relative to simpler approaches.

FIG. 1 illustrates an example of a process 10 configured to measure quality of determinations of semantic similarity (or other relationships) between documents (or other items, like mentioned entities) in an analyzed corpus. In some cases, the analysis of semantic similarity may have already been completed, and the results of that analysis may be retrieved from storage, for example, at the instruction of a user submitting an instruction to perform the process 10, such as by a user wishing to compare performance of two algorithms on the same corpus.

In many likely commercially relevant use cases, process 10 may tax the limits of the computational resources available. The process of measuring accuracy (or other measures of quality) of determinations of semantic similarity, and other use cases, is often constrained by time and computing resources available. For example, some embodiments may perform the analyses described herein within less than 24 hours, for example, within less than five hours, like within less than one hour, and in some cases in real-time (e.g., within less than 30 seconds following a user request, and in some cases, within well less than 5 seconds) using, for example, less than 1 Tflops (or floating point operations per second), 500 Gflops, or 100 Gflops of computing power to service the requested analysis. In some cases, a single computing device (or virtual machine having a distinct operating system instance or a container instance) may implement the process 100, or some embodiments may be implemented in a distributed fashion, with a plurality of computing systems operating in a networked environment, like a data center. Examples of such computing systems are described below with reference to FIG. 3.

In some embodiments, the process 10 includes obtaining data upon which the process 10 operates. In some cases, the process 10 takes as an input a graph in the form of a list of edges, adjacency matrix, or other format. Some embodiments may also ingest the content of each document as plain text, or other forms of input may be obtained as described below, e.g., with reference to FIG. 2. To perform text quantitative analysis, some embodiments may covert such text into text vector representations (like feature vectors), e.g., rows or columns in a term-document matrix where each row or column corresponds to a different document. Similarly, the graph structure may be converted into a matrix to expedite computing operations and conserve memory relative to other data structures, like key-value pairs (though embodiments are also consistent with the use of key-value pairs, e.g., with document identifiers serving as keys to lists of document terms). In this example, the process 10 includes obtaining an internal dataset 12, an external dataset 14, and a graph topology 16, examples of each of which are described below with reference to FIG. 2.

In some embodiments, the internal dataset 12 may be an analyzed corpus of documents (or other items) having semantic (or other) interrelationships reflected in the graph topology 16. The external dataset 14 may include a different corpus of documents (or other data sources described below) that have information about things that both are discussed in the internal dataset 12 and give rise at least in part to the graph topology 16. Thus, the external dataset 14 may include content that was not considered when constructing the graph topology 16. External dataset 14, in some embodiments, may provide an independent source of information for evaluating the quality of graph topology 16.

The external dataset 14 may be a different source of information from that considered when constructing the graph topology 16. For example, the external dataset 14 may be structured or unstructured data. In some cases, the external dataset 14 is a different instance of the above-described examples of corpora for the internal dataset 12, e.g., the internal dataset 12 may be based on academic articles and the external dataset 14 may be based on a body of journalism. In some cases, the external dataset 14 may be retrieved from a different source or repository relative to the internal dataset 12, e.g., based on documents with different authors and published by different entities.

In some embodiments, the external dataset 14 may be indexed to facilitate selection of documents, or the external dataset 14 may be the result of selection, e.g., querying based on text of nodes graph 16. In some cases, the external dataset 14 includes data relevant to the graph topology 16 obtained with reference to an index. Examples include results from search engines and online encyclopedias, like Wikipedia™. In some cases, the external dataset 14 may be obtained by searching the index for certain terms, like entity names or other keywords, and retrieving responsive documents. In some embodiments, the external dataset may be expanded to include other documents referenced by, for example hyperlinked to, documents within an external dataset, for example, online encyclopedia webpages linked to by a given online encyclopedia page. In some cases, this technique for expanding the external dataset may be repeated for some or all of the retrieved documents by following links. In other examples, the external dataset may be obtained by curation, for example, by a human analyst compiling a collection of documents known to be relevant to relationships revealed within the graph topology 16.

In some embodiments, the internal dataset 12 or external dataset 14 may be a corpus of documents that have undergone some processing, for example, feature extraction and compression to conserve memory and expedite processing. For example, in some cases, stop words or terms satisfying a threshold for term frequency inverse document frequency (TF-IDF) scoring may be filtered from the documents, removing those terms, and leaving the documents shorter. In another example, documents may be excerpted, for example, excluding all but the first and last paragraph of the document, or first and last paragraphs following a heading, as indicated by a markup language of the document. In some embodiments, documents may be excerpted by crawling a document object model and extracting unstructured text based on the location and context of the unstructured text within the document object model, for example, text within a bracketed set of tags indicating a title or body of an article.

In other examples, the external dataset may be or include structured data, for example, data in a relational database having a plurality of fields of information about given key values, like business names, product names, entity names, and the like, and the external dataset 14 may be a collection of responses to queries corresponding to the key values. In another example, the external dataset may be triples in a resource description framework (RDF) format, for instance, or responses to queries to a knowledge graph, with query values or key values corresponding to things discussed within the internal dataset, for example, extracted entities, sentiments, topics, or combinations thereof. Other examples include data arranged in hierarchical serialized data formats, like XML or JSON.

In some cases, the external dataset 14 may be obtained by querying a larger data collection (e.g., unstructured text documents or relational databases, or the like) with query terms obtained from the internal dataset 12. For example, such query terms may be obtained by extracting entities mentioned in unstructured text of the internal dataset 12. Examples of techniques for extracting entities include techniques for named-entity extraction provided by the set of modules titled "A Nearly-New Information Extraction System" (ANNIE) in the General Architecture for Text Engineering (GATE) system published by the University of Sheffield, or the Named Entity Recognition feature of the Natural-Language Toolkit published by Team NLTK and available from nltk.org. In some cases, entities are extracted by parsing unstructured text, analyzing the first character of each term to determine whether the term is capitalized, and then determining whether proceeding terms are followed by a period to determine whether the term is likely a proper noun. Sequences of capitalized terms may also be detected and determined to constitute an entity name corresponding to a proper noun. In some embodiments, a collection of candidate proper nouns may be extracted, and those proper nouns having greater than a threshold TF-IDF score for the respective document may be designated as entities discuss within the document and used individually or in combination as query terms to retrieve or label the external dataset 14. Or some embodiments may receive manually entered inputs from humans, for instance, crowd-sourced external datasets 14.

In some embodiments, the external dataset 14 may include a plurality of subsets of documents, for example, one subset for each query by which documents or other data is retrieved, and the respective subsets may be associated in memory with the query or the document upon which the query is based within the internal dataset 12. Thus, in some embodiments, each document in internal dataset 12 may be associated with a different set of information in the external dataset 14 (which is not to imply that such information may not be overlapping between different documents in the internal dataset or that every set of information in the external dataset made must be different for the different respective documents in the internal dataset 12). In some cases, when evaluating the quality of a connection between documents in the internal dataset indicated by the graph topology 16, the corresponding subsets of information from the external dataset 14 may be retrieved and serve as the external dataset 14 for purposes of subsequent steps. This correspondence may be determined before subsequent processes (e.g., by extracting entities and searching for every document in an analyzed corpus) or after subsequent processes in different embodiments (e.g., by searching within an external dataset based on the below-described adjacent nodes identified during evaluation of graph quality after nodes are identified as adjacent).

In some embodiments, the graph topology 16 may be a data structure in memory that indicates semantic relationships between documents in the internal dataset 12, which may be some or all of an analyzed corpus of documents. In some cases, the graph topology is a weighted graph having nodes corresponding to respective documents in the corpus and edges having weights indicating semantic similarity between pairs of nodes to which those edges connect (that is, semantic similarity between unstructured text in documents corresponding to those nodes, e.g., semantic similarity in the sense of distributional semantic similarity where bodies of text with similar distributions of terms are deemed to have similar meanings).

In some embodiments, the graph topology 16 may be arranged as a matrix. In some cases, each row and column of the matrix may correspond to one of the documents in a corpus, with each document having one row and one column of the matrix. Values within the matrix may indicate the semantic similarity between the document of the respective row and the respective column. Documents along a diagonal may have a zero value (or other designated value, like null), as the same document may match on the row and column, and it may be useful to distinguish those identify relationships from other non-identity semantic similarity values to avoid distorting measures of similarity. Thus, in some embodiments, the graph topology 16 may be arranged as a square symmetric matrix. As the data structure indicates, adding additional documents to the corpus can dramatically expand the computational and memory intensity of a given analysis, as each added document potentially gives rise to pairwise relationships with every extant document in the matrix. Accordingly, for larger collections of documents, some embodiments may execute techniques described below for accelerating linear algebra operations in ways that account for the memory hierarchy of computer systems and compressing matrices in memory, particularly sparse matrices. Graph topology 16 may be obtained with a variety of techniques, including using tools provided by Quid, Inc. of San Francisco, Calif., and the techniques described below. In other embodiments, graph topology 16 may represent relationships between things other than documents, e.g., other units of language (like corpa, paragraphs, or sentences), sentiments, terms, or entities (like businesses, products, places, or people).

In some embodiments, the graph topology 16 may be pruned to create an adjacency matrix, as indicated by Block 18. In some cases, computer processes may run faster and consume less memory, particularly for large datasets, as a result of such pruning, as unprogrammed applications may tend to scale poorly in terms of memory complexity and processing complexity. (That said, some embodiments may not prune and may have sufficient computational resources, which is not to suggest that any other step or process were feature described herein may not also be omitted in some embodiments.) In some cases, this step may include comparing each weighted edge to an adjacency threshold and discarding, or setting a value 20, those edges that fail to satisfy the threshold, e.g. have less than a threshold amount of semantic similarity. In some cases, this step 18 may yield an adjacency matrix 20 (e.g., another square symmetric matrix with zeros along a diagonal, like that described above) having fewer nonzero weighted edges between pairs of documents. In some cases, the adjacency matrix 20 may constitute a sparse matrix amenable to techniques described below to conserve memory and expedite processing. Or in some embodiments, adjacency matrix 20 may remain a dense matrix.

Some embodiments of process 10 may create a feature set matrix, as indicated by Block 22, from the internal dataset 12. In some cases, a resulting feature set matrix 24 may be a term document matrix of the corpus of the internal dataset 12 by which the graph topology 16 is created. In some embodiments, the term document matrix may include a plurality of vectors, each vector corresponding to a respective document within the corpus, and values within the vector corresponding to the presence, number, or frequency of occurrences of n-grams within the respective document. In some cases, these vectors may be appended to one another to constitute the feature set matrix 24, for example, rows of the matrix may correspond to documents, and columns to n-grams, or vice versa. In some cases, the vectors may be appended to one another in the same order as documents are listed across rows or columns in the adjacency matrix 20 to facilitate linear algebra operations and conserve memory over systems that label these values independent of sequence.

In some cases, the feature set matrix 24 may be created by parsing unstructured text of the internal dataset 12, for example, initially on a word-by-word basis, and updating a document vector as each word is encountered, for example, by incrementing a count for a value of the vector corresponding to the encountered word after the word is encountered. In some cases, to expedite access, the values of the vector may be sequenced in a particular fashion, for example alphabetically, to facilitate a binary search, or according to a hash table, e.g., with some amount of collisions being tolerated. Further, the same document may be parsed on a pair-of-terms basis, with a similar updating routine to update values corresponding to n-grams having an in value of two, and then a similar process may be performed on a sequence of three terms basis. In some embodiments, such parsing may be done in parallel, e.g., with a MapReduce implementation, to expedite processing, with different portions of the vector assigned to different threads or computing devices, that then return a subset of the vector that is appended to the other subsets. In some cases, counts may be divided by a count of terms in a document to determine a frequency. In some cases, alternatively or additionally, a co-occurrence matrix may be determined with similar techniques, e.g., when analyzing similarity relatedness of entities or terms in documents.

In some cases, some terms may be disregarded as having low information value. In some embodiments, a list of stop words may be maintained and compared against parsed values to determine whether to disregard the parsed term, e.g., upon determining the parsed word is a stop word. Examples of stop words include terms like "the," "and," "a," and other relatively common terms.

Some embodiments may use more sophisticated techniques to determine which terms to disregard or down weight. Examples include term frequency inverse document frequency analysis. Some embodiments may, either based on a sample or analysis of an entire corpus, determine a term frequency-inverse document frequency of n-grams and disregard n-grams failing to satisfy a threshold score, indicating the terms are relatively frequent and about as frequent within a given document as they are within a larger corpus. This is expected to increase the sparseness of the feature set matrix 24, which may enhance the effect of various techniques described below for expediting operations on and reducing the memory consumed by sparse matrices. In some embodiments, the size of n-grams may range from an n-gram of a single term up to an n-gram of a plurality of terms, for example, more than or equal to three terms, five terms, or seven terms, depending upon available computing resources and diversity of language in use. As a result, in some embodiments, the corresponding term document matrix may be relatively large, as there are a relatively large number of different terms and sequences of terms that may occur within a given corpus. Another attribute of this matrix is that in some cases, many of the values may be zero, as many of the terms occurring in other documents will not occur within a given document, giving rise to the sparse matrix designation.

In some cases, a similar process may be performed to create a feature set matrix for the external dataset 14, as indicated by Block 26. A resulting feature set matrix 28 may similarly include a set of vectors, each vector corresponding to one document (or query or database record) of the external dataset 14, and values of the vector corresponding to be presence, number, or frequency of corresponding n-grams. In some cases, the sequencing of in n-gram values in the feature set matrix 28 may match that of the feature set matrix 24 to facilitate subsequent linear algebra operations. Additionally or alternatively, in some cases, a co-occurrence matrix, like that described above, may be determined for the external dataset 14.

Next, some embodiments may remove non-shared features, as indicated by Block 30, from the feature set matrices 24 and 28. In some cases, non-shared features may be n-grams that both occur in the internal dataset 12 and are absent from the external dataset 14, or vice versa. Or in some cases, non-shared features may be n-grams that occur with greater than a threshold frequency in the internal dataset 12 but do not occur with greater than the threshold frequency in the external dataset 14, or vice versa. In some embodiments, non-shared terms may be determined for each external dataset 14 corresponding to a given document in the internal dataset 12 or a given query, with similar comparisons made between these internal and external documents. As a result, a further pruned feature set matrix 34 may correspond to the feature set matrix 24, and a further pruned feature set matrix 32 may correspond to the feature set matrix 28, each having non-shared features removed.

Next, some embodiments may determine a contribution of features in the feature set matrix 24 to the relationships in the adjacency matrix 20, as indicated by Block 36. In some embodiments, the adjacency matrix 20 may be multiplied by the feature set matrix 24 to produce an adjacency-weighted feature set matrix 38 (i.e., E=M×N).

As noted above, these matrices may be relatively large as compared to the available computing resources and time available. In some use cases, these challenges may be mitigated by using some of the below-describe techniques for expediting matrix operations. Or, for simple use cases, a more naive approach may be used, by which, for a given row, each column is iteratively retrieved from a lower level of a memory hierarchy (e.g., storage, random-access memory, L3 cache, and L2 cache, up to processor registers), multiplied by corresponding values of the given row and then summed, with the resulting value written into the corresponding row and column position of matrix 38. In this example, each column may be moved up the memory hierarchy to the processor multiple times, for example, at least once for each row, and in some cases multiple times for each row. For larger analyses, though, these operations may impose substantial delays in the aggregate, as the time taken to move data, for example, from storage to a central processing unit (CPU) register, or even from dynamic random access memory (DRAM) to a CPU register, can be several orders of magnitude longer than the time taken to access a given value in a CPU register, or even a higher level of cache memory on the CPU. That said, some embodiments may use this simpler approach to conserve developer time where the scale of the datasets and available computing hardware permit such implementations.

Next, some embodiments may compare the adjacency-weighted matrix 38 and the feature set matrix 32 from the external dataset 14 to measure the quality of the graph topology 16. In some embodiments, the graph topology 16 or adjacency matrix 18 may be sampled, for example, by randomly (e.g. pseudo-randomly) selecting evaluation nodes, for example, 20 or more, 200 or more, or 2,000 or more from a larger set of nodes of the graph topology 16, which as noted above correspond to documents in the analyzed corpus. Or in some embodiments, the evaluation nodes may be all of the nodes in the graph topology 16 or adjacency matrix 18.

In some embodiments, for each evaluation node, neighboring nodes in the adjacency matrix 18 may be determined. (It should be appreciated that embodiments are not limited to the sequence depicted, e.g., this step may be performed earlier in the process 10, which is not to suggest that any other aspect is limiting.) For example, a vector corresponding to a row or column of the adjacency matrix 18 at the position of the evaluation node may be retrieved, and non-zero values may indicate a neighboring (e.g., adjacent) node and corresponding neighboring document.

With these adjacent nodes known, the portions of the external dataset retrieved based on information extracted from the text of the adjacent nodes may be determined. For example, a separate external dataset may be maintained and processed, as described above, for each such node, or a subset of the vectors of the feature set matrix 32 may be determined to correspond to those adjacent nodes, e.g., corresponds to documents or other text retrieved based on query terms selected in view of the text of the adjacent node. Thus, feature vectors of documents (or other sources of data) associated with the text of nodes adjacent the given evaluation node of a present iteration may be identified, for example, retrieved from storage or designated in program state. These feature vectors, therefore, may contain terminology from an external data source identified from information in nodes adjacent an evaluation node, which in a given iteration is being analyzed for the quality of those adjacency determinations.

In some embodiments, a weighted-adjacency vector for the evaluation node of a given iteration may be retrieved from the weighted-adjacency matrix 38 and compared to the feature vectors selected from the external datasets feature matrix 32. That is, in some embodiments, text of a given document in the analyzed corpus may be compared to text in the external dataset 14 (e.g. an external corpus) that was selected in virtue of a relationship with adjacent nodes to the given document.

Comparison between the respective weighted-adjacency vector of the evaluation node and selected feature vectors from the external dataset 14, as reflected in the feature set matrix 32, may take many forms, such as determining the following examples of exogenous similarity scores. In some cases, a plurality of feature vectors may be selected (e.g., corresponding to a plurality of documents in the external dataset 14), and group statistics on comparisons between this plurality of feature vectors and the weighted-adjacency vector may be calculated, such as a mean, median, or mode angles between the weighted-adjacency vector and the respective feature vectors. In some cases, group statistics may be calculated on a cosine similarity between these vectors or a Minkowski distance. In some embodiments, a single feature vector may be selected, or a plurality may be selected. In some embodiments, similarity may be determined based on differences between these vectors (e.g. between the weighted-adjacency vector and each of the feature vectors of matrix 32). For example, the smaller the difference (or group statistic, such as a measure of central tendency, of the same), the more semantically similar the selected vectors from matrix 32 are to the weighted-adjacency vector of the evaluation node retrieved from matrix 38.

Differences may be processed in various ways. In some embodiments, this difference may be compared to a difference threshold to create a binary indication of whether a collection of edges in the adjacency matrix 18 of the evaluation node are of adequate quality. Or in some cases, a score may be determined, for example, the difference itself may be a score. In some cases, a plurality of differences may be calculated for each evaluation node, for example, one difference for each adjacent node and the corresponding selected based vectors in the matrix 32 for documents that were retrieved based on text of those respective adjacent nodes. Again, these differences may be compared to a threshold or may be used to determine a quality score corresponding to individual edges of the adjacency matrix 18.

In some embodiments, comparison between the respective weighted-adjacency vector and the selected feature vectors derived from external dataset 14 may be a relative comparison among the internal dataset 12. For instance, embodiments may compare relative similarity of the feature vectors to the vectors of evaluation node and other nodes of the weighted-adjacency matrix 18 based on graph topology 16. For example, the above described measures of difference between such vectors may be calculated for both the evaluation node and weighted-adjacency vectors of a plurality of other nodes of the graph topology 16, in some cases for all of the other nodes, or in some embodiments a sampling of the nodes. In some embodiments, a measure of difference like those described above may be associated with each of these nodes of the graph topology 16 (e.g., with each of the documents in an analyzed corpus or a sampling of such documents).

The nodes may then be ranked according to this measure of difference, for instance, in order of increasing difference. Various sorting techniques may be used, e.g., a bubble sort, quick sort, heap sort, or merge sort by difference. Some embodiments may then determine the rank of the evaluation node relative to the other nodes, and the rank may be a measure of quality of semantic similarity determinations, with lower ranks indicating higher-quality, meaning that the evaluation node is more similar to the selected documents of the external dataset (or other collections of data like query responses) than other documents within the analyzed corpus. In some embodiments, a threshold rank may be compared to the rank of the evaluation node, and a binary value may be determined indicating whether the threshold rank is higher than the determined rank as an indication of whether semantic similarity was accurately determined for the evaluation node.

In some embodiments, one or more of these processes may be repeated for each of a plurality of the evaluation nodes, in some cases resulting in one or more measures of quality of determinations of semantic similarity for each of the respective evaluation nodes. This process, in some cases, may be executed concurrently by multiple computing devices, e.g., with each having a copy of the relevant matrices in local memory, to expedite operations. In some embodiments, these measures of quality may be aggregated with various techniques or used to various ends. In some embodiments, the graph topology 16 or adjacency matrix 18 may be pruned to remove edges having worse than a threshold measure of quality. In some embodiments, a measure of central tendency may be calculated for the measures of quality, for example, a mean, median, or mode. In some embodiments, a measure of variability of the measures of quality may be calculated, for example, a standard deviation, a range, a max, or a minimum. In some embodiments, one or more of these values may be output to a user requesting a measure of the quality of the graph topology 16, for example, in response to a request for such an analysis, in some cases in the form of a responsive webpage sent to a remote computing device executing a web browser. In some embodiments, this technique may be performed as part of an automated test of newly released code, to determine whether a new version improves or damages quality of analyses.

As noted above, in some cases, the present techniques may measure the quality of semantic similarity graphs of similarity between documents. Some embodiments may apply similar techniques to graphs of other items within unstructured plaint text documents. For instance, quality of a semantic similarity or relatedness graph may be measured by comparing a co-occurrence matrix based on an external dataset 14 to a co-occurrence matrix upon which such a graph is formed.

In some embodiments, the process 10 may be performed within a single instance of one of the computing systems described below with reference to FIG. 3, or some embodiments may distribute some portions of the operations amenable to parallelization across multiple computing systems. Certain matrix operations, however, are not expected to be amenable to such distributed processing when accounting for delays due to network exchanges across a local area network. In some embodiments, the process 10 may be performed with entire matrices held in program state, for example at a DRAM level or higher level of a memory hierarchy.

The claims are best read in view of the specification, though limitations should not be imported from the specification into the claims. Accordingly, it should be noted that examples of weighted semantic graph of semantic similarity can include either of the graph topology 16 and the adjacency matrix 18. In some cases, pairwise edges may be generalized to clusters, and the techniques described herein may be applied to such a mapping, e.g., documents may be mapped to clusters with weighted edges indicative of the strength of their fit within the cluster. Obtaining access to an external corpus may include having the corpus in memory or having the ability to query and retrieve text data from a remotely hosted corpus. Identifying neighboring nodes based on adjacency can be performed without creating a separate adjacency matrix, e.g., connections in the graph topology 16 may be filtered according to a threshold weight, which is not to suggest that any other feature may not also be omitted in some embodiments.

Limitations as to sequence should not be read into the claims except where explicitly and clearly indicated. For instance, selecting documents from the external corpus based on the selected documents being associated with an adjacent node includes performing the selection before the adjacent node is identified as such, e.g., by performing the selection for all documents in the analyzed corpus in advance of selecting adjacent nodes. A similar situation applies to selecting documents from the external corpus based on the selected documents being associated with the adjacent node, as adjacent nodes and selected documents need not be identified before performing this step in some embodiments, e.g., where all such documents are processed and then selection is performed after processing. Similarly, determining exogenous semantic similarity scores between the selected documents from the external corpus and the respective evaluation node can be performed before other selection or identification steps where, for instance, all or a substantial amount of permutations over which such selections or identifications are made are performed in advance of the selection or identification. Similar interpretations should be applied to other claim elements where reference to earlier operations is used to make the claim easier to parse rather than affirmatively recite limitations as to sequence, e.g., as would be explicitly indicated by use of phrases like "after performing X, performing Y."

Figure 2:
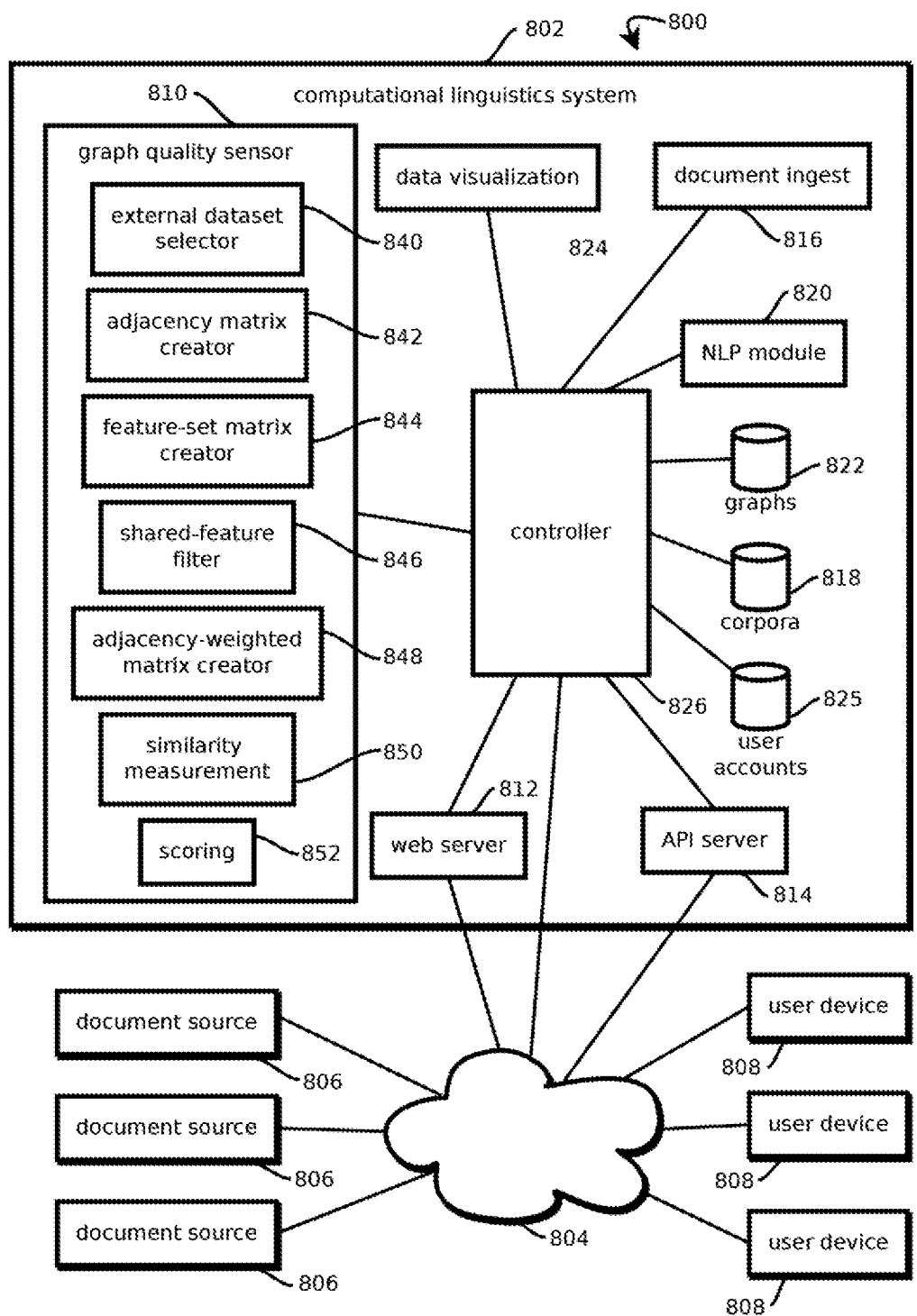
FIG. 2 is a block diagram of an example of a system configured to perform the process of FIG. 1.

FIG. 2 illustrates, in block diagram form, the logical architecture of an example of a computing environment 800 in which the above-described techniques may be implemented. In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit queries to the system 802 (which may be geographically remote) via a web browser executing on user devices 808 and exchanges over the Internet 804. In some embodiments, users may submit queries to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a graph-quality sensor 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

In some embodiments, the graph quality sensor 810 may execute the process 10 of FIG. 1. In some embodiments, the sensor 810 may include an external dataset selector 840, an adjacency matrix creator 842, a feature-set matrix creator 844, a shared-feature filter 846, an adjacency-weighted matrix creator 848, a similarity measurement module 850, and a scoring module 852. In some embodiments, the selector 840 may identify adjacent nodes, generate queries based on the adjacent nodes, send the queries, and ingest and store responsive data, as described above. In some embodiments, the adjacency matrix creator 842 may be operative to perform step 18 as described above. In some embodiments, the feature-set matrix creator 844 may be operative to perform steps 22 and 26 described above, and the shared-feature filter 846 may be operative to perform step 30 described above. In some embodiments, the adjacency-weighted matrix creator 848 may be operative to perform step 36 described above; the similarity measurement module 850 may be operative to perform step 40; and the scoring module 852 may be operative to perform step 42.

In some embodiments, results may be stored in memory, e.g., in the graph repository 822 in association with the corresponding graph, or results may be transmitted to a user device for display in a web browser, e.g., in response to a query for a quality measure. In some cases, visual weight or visual attributes of displayed graphs, like node or edge size, color, drop shadow, transparency, or attributes of a physics-based simulation (like in a force directed layout of a graph) may be modified based on quality measures for individual nodes or edges.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for reasonhumans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity websites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 3:
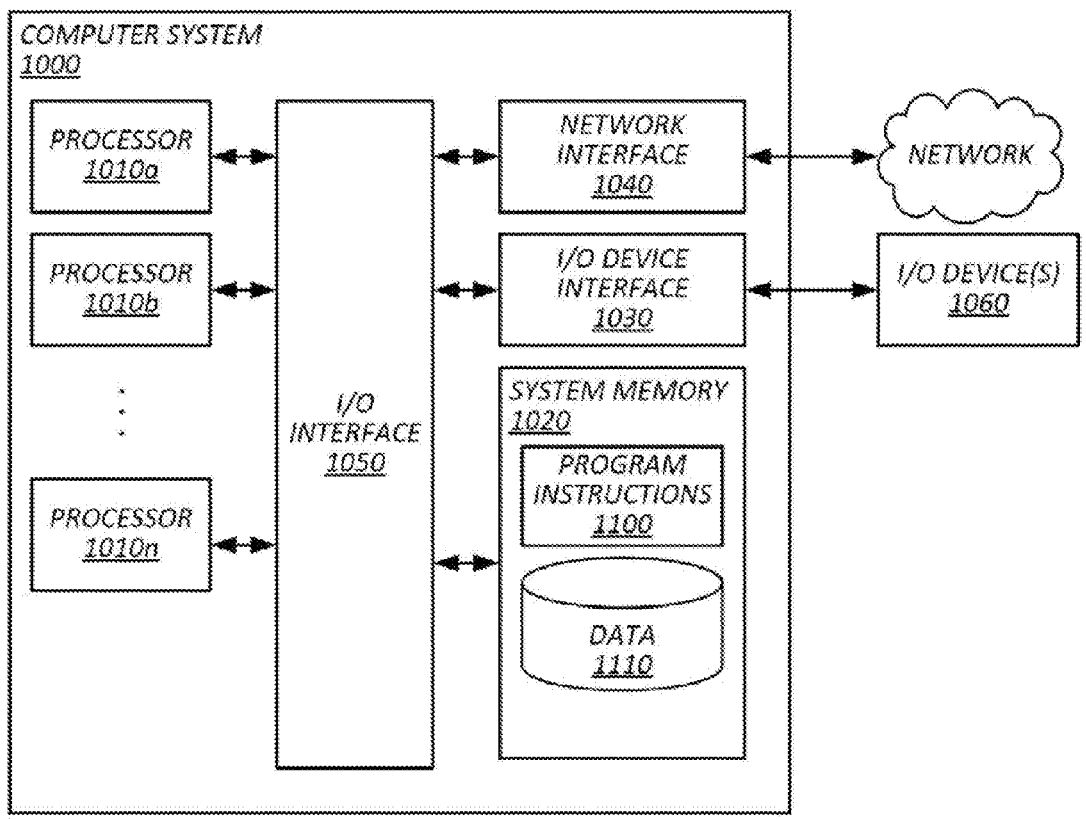
FIG. 3 is a block diagram of an example of a computer system by which the above-techniques may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following enumerated embodiments:

1. A method of measuring quality of determinations of semantic similarity between documents in a corpus, the method comprising: obtaining a weighted semantic graph of semantic similarity between unstructured text in documents within an analyzed corpus, wherein weights of the semantic graph are inferred by unsupervised learning of the weights by one or more computers, and wherein the semantic graph comprises: more than 50 nodes, each corresponding to at least one respective document within the analyzed corpus; and more than 200 weighted edges, each weighted edge linking two of the nodes and having a score indicating an amount of semantic similarity between documents corresponding to the two linked nodes; obtaining access to an external corpus having at least some other documents with unstructured text about entities mentioned in the analyzed corpus, the other documents not being within the analyzed corpus; for each of at least 20 evaluation nodes among the nodes of the graph, by one or more processors, scoring semantic similarity between documents in the analyzed corpus and documents in the external corpus selected as being associated with adjacent nodes to the respective evaluation node, wherein scoring semantic similarity comprises: determining the adjacent node in the graph based on the adjacent node sharing an edge with the respective evaluation node; selecting one or more documents from the external corpus based on the selected documents being associated with the adjacent node; determining n-gram weights of a plurality of n-grams in text of the document corresponding to the adjacent node based on the weight of the edge linking the respective evaluation node to the adjacent node in the semantic graph; and determining one or more exogenous semantic similarity scores between the documents selected from the external corpus and the respective evaluation node, the exogenous semantic similarity scores being determined based on the determined n-gram weights and the presence of corresponding n-grams in the respective documents selected from the external corpus; and determining, by one or more processors, a measure of quality of at least some of the weighted edges of the semantic graph based on the exogenous semantic similarity scores.

2. The method of embodiment 1, wherein: the weighted edges are arranged as a semantic similarity matrix having rows and columns corresponding to each of the documents and values corresponding to the edge weights, the semantic similarity matrix being a symmetric matrix; an n-gram representation of the analyzed corpus is obtained and arranged as a first n-gram matrix comprising a plurality of vectors, each vector corresponding to one of the documents in the analyzed corpus, and each vector comprising a plurality of values indicating presence of a corresponding n-gram in the respective document; an n-gram representation of selected documents from the external corpus is obtained and arranged as a second n-gram matrix comprising a plurality of vectors, each vector corresponding to one of the documents in the external corpus, and each vector comprising a plurality of values indicating presence of a corresponding n-gram in the respective document; determining n-gram weights comprises: multiplying the first n-gram matrix, representing n-gram of the analyzed corpus, by the semantic similarity matrix to produce a third n-gram matrix comprising a plurality of vectors, each vector corresponding to a respective one of the documents in the analyzed corpus, and each vector comprising a plurality of values, the values being the determined n-gram weights, and the n-gram weights indicating a contribution of a corresponding n-gram to weights of edges to documents adjacent the respective document in the semantic graph; selecting one or more documents from the external corpus that are associated with the adjacent node comprises: selecting vectors from the second n-gram matrix to represent the selected documents; and scoring semantic similarity between documents in the analyzed corpus and documents in the external corpus selected as being associated with adjacent nodes to the respective evaluation node comprises: identifying a vector in the third n-gram matrix that both corresponds to the respective evaluation node; and determining similarity between the identified vector and the selected vectors from the second n-gram matrix based on angles between the vectors.

3. The method of embodiment 1, wherein: the weighted edges are arranged as a semantic similarity matrix; an n-gram representation of the analyzed corpus is obtained and encoded as a first n-gram matrix; and an n-gram representation of the one or more selected documents from the external corpus is obtained and encoded as a second n-gram matrix.

4. The method of embodiment 3, wherein determining n-gram weights comprises: multiplying the first n-gram matrix by the semantic similarity matrix to produce a third n-gram matrix.

5. The method of embodiment 4, wherein scoring semantic similarity relative to the external corpus comprises: selecting a vector in the third n-gram matrix and a vector in the second n-gram matrix; and performing steps for determining similarity between the selected vectors.

6. The method of any of embodiments 1-5, wherein selecting one or more documents from the external corpus that are associated with the adjacent node comprises: extracting an entity mentioned in the document corresponding to the adjacent node from the unstructured text of the document corresponding to the adjacent node; selecting the one or more documents from the external corpus based on the extracted entity.

7. The method of any of embodiments 1-6, wherein selecting the one or more documents based on the extracted entity comprises: accessing an index of topics of documents in the external corpus to identify a document about the entity; and retrieving data indicative of n-grams of the document about the entity from a location indicated by the index.

8. The method of any of embodiments 1-7, wherein obtaining a weighted semantic graph comprises: obtaining the analyzed corpus, the analyzed corpus comprising more than 500 documents; for each document in the analyzed corpus, with one or more processors: determining a respective n-gram vector, each n-gram vector comprising a plurality of values each indicating presence of a respective n-gram in text of the respective document, wherein the n-gram vectors indicate at least 500 values and correspond to at least some n-grams including three words; determining the scores indicating the amount of semantic similarity relative to the other documents in the analyzed corpus based on angles between the n-gram vector of the respective document and n-gram vectors of the other documents in the analyzed corpus.

9. The method of embodiment 8, comprising: determining the edges based on which of the scores indicating the amount of semantic similarity satisfy a threshold.

10. The method of any of embodiments 1-9, comprising, for at least some of the evaluation nodes: scoring semantic similarity relative to the external corpus by performing operations comprising: determining a plurality of other adjacent nodes that are adjacent the respective evaluation node in the graph; determining n-gram weights of a plurality of n-grams in the text of the documents corresponding to the other adjacent nodes based on the weight of the edge linking the respective evaluation node to the respective other adjacent node in the semantic graph; selecting additional documents from the external corpus that are associated with at least some of the other adjacent nodes; determining exogenous semantic similarity scores for other documents from the external corpus based on the determined n-gram weights and the presence of the corresponding n-grams in the selected other documents.

11. The method of any of embodiments 1-10, wherein: determining n-gram weights of a plurality of n-grams in the text of the document corresponding to the adjacent node based on the weight of the edge linking the respective evaluation node to the adjacent node in the semantic graph comprises: performing steps for determining n-gram weights of a plurality of n-grams in the text of the document; selecting one or more documents from the external corpus based on the selected documents being associated with the adjacent node comprises: performing steps for selecting one or more documents from the external corpus; determining one or more exogenous semantic similarity scores between the documents selected from the external corpus and the respective evaluation node comprises: performing steps for determining exogenous semantic similarity scores.

12. The method of any of embodiments 1-11, wherein determining a measure of quality of the weighted edges of the analyzed corpus based on the exogenous semantic similarity scores comprises: ranking at least a plurality of documents in the analyzed corpus based on exogenous semantic similarity scores indicative of similarity relative to the selected documents from the external corpus; and determining the measure of quality based on the ranking of a given document produced by documents selected from the external corpus that are associated with adjacent nodes of the given document.

13. The method of any of embodiments 1-12, comprising: scoring semantic similarity of documents in the analyzed corpus to documents in the external corpus selected as being associated with non-adjacent nodes to the respective evaluation node, wherein the non-adjacent nodes are deemed to be in a cluster with the evaluation node.

14. The method of any of embodiments 1-13, wherein determining exogenous semantic similarity scores for documents in the external corpus based on the determined n-gram weights and the presence of the corresponding n-grams in the selected documents from the external corpus comprises: normalizing values indicating presence of n-grams in the documents from the external corpus based on both frequency with which the respective n-gram occurs within a respective document and frequency with which the respective n-gram occurs in a corpus of documents.

15. The method of any of embodiments 1-14, comprising: multiplying an n-gram matrix representing the occurrence of n-grams in documents in the analyzed corpus by a semantic similarity matrix of the edge weights by performing operations comprising: obtaining a sparse matrix representation of the n-gram matrix in which vectors within the matrix are represented as respective indices identifying the locations on the respective vectors having non-zero values; dividing the semantic similarity matrix into tiles, each tile comprising a plurality of adjacent values from a plurality of rows and a plurality of columns in the semantic similarity matrix; and for each of at least a plurality of the tiles: loading the respective tile from a first level of a memory hierarchy to a second level of a memory hierarchy that has faster access times for a processor that the first level of the memory hierarchy; multiplying the respective tile by at least part of the n-gram matrix to produce a product; and updating an existing value in a resultant matrix by adding the product to the existing value.

16. The method of any of embodiments 1-15, comprising: determining that a given n-gram occurring in the external corpus or the analyzed corpus does not occur in at least part of the other corpus and, in response, discarding the given n-gram.

17. A system, comprising: one or more processors; memory storing instructions that when executed by at least some of the processors effectuate operations comprising: obtaining a semantic similarity graph having nodes corresponding to documents in an analyzed corpus and edges indicating semantic similarity between pairs of the documents; for at least a plurality of nodes in the graph, evaluating accuracy of the edges based on neighboring nodes and an external corpus by performing operations comprising: identifying the neighboring nodes based on adjacency to the respective node in the graph; selecting documents from an external corpus based on a references in the selected documents to entities mentioned in the documents of the neighboring nodes; and determining how semantically similar the respective node is to the selected documents.

18. The system of embodiment 17, wherein determining how semantically similar the respective node is to the selected documents comprises: multiplying at least some of the edge weights by at least some values indicating the presence of n-grams in a document in the analyzed corpus to produce a weighted n-gram value.

19. The system of embodiment 18, wherein determining how semantically similar the respective node is to the selected documents comprises: determining how semantically similar the respective node is to the selected documents relative to other documents in the analyzed corpus by performing operations comprising: determining similarity scores of semantic similarity between the selected documents and at least a plurality of documents in the analyzed corpus, at least some of the similarity scores being based on the weighted n-gram value; and comparing similarity scores of the plurality of documents.

20. The system of any of embodiments 17-19, the operations comprising: multiplying an n-gram matrix representing occurrence of n-grams in documents in the analyzed corpus by a semantic similarity matrix of edge weights by performing operations comprising: dividing the semantic similarity matrix into tiles, each tile comprising a plurality of adjacent values from a plurality of rows and a plurality of columns in the semantic similarity matrix; and for each of at least a plurality of the tiles: loading the respective tile from a first level of a memory hierarchy to a second level of a memory hierarchy that has faster access times for a processor that the first level of the memory hierarchy; multiplying the respective tile by at least part of the n-gram matrix to produce a product; updating an existing value in a resultant matrix by adding the product to the existing value.

21. The system of any of embodiments 17-20, wherein: the analyzed corpus is a corpus of documents having a median word length of more than 200 words obtained from websites of more than 100 companies; the external corpus comprises webpages about at least a majority of the companies obtained from an encyclopedia website, documents in the external corpus having a median word length of more than 100 words; and the edges are weighted edges indicative of the degree to which descriptions of the companies are semantically similar between respective pairs of the companies.

22. A tangible, non-transitory, machine-readable medium storing instructions that when executed by a data processing apparatus cause the data processing apparatus to perform operations comprising those of any of embodiments 1-21.

23. A system, comprising: one or more processors; and memory storing instructions that when executed by the processors cause the processors to effectuate operations comprising those of any of embodiments 1-16.

24. A method, comprising: the operations of any of embodiments 17-21.

What is claimed is:

1. A method of measuring quality of determinations of semantic similarity between documents in a corpus, the method comprising:
   obtaining a weighted semantic graph of semantic similarity between unstructured text in documents within an analyzed corpus, wherein weights of the semantic graph are inferred by unsupervised learning of the weights by one or more computers, and wherein the semantic graph comprises:
      more than 1000 nodes, each corresponding to at least one respective document within the analyzed corpus; and
      more than 2000 weighted edges, each weighted edge linking two of the nodes and having a score indicating an amount of semantic similarity between documents corresponding to the two linked nodes;
   obtaining access to an external corpus having at least some other documents with unstructured text about entities mentioned in the analyzed corpus, the other documents not being within the analyzed corpus;
   for each of at least 20 evaluation nodes among the nodes of the graph, by one or more processors, scoring semantic similarity between documents in the analyzed corpus and documents in the external corpus selected as being associated with adjacent nodes to the respective evaluation node, wherein scoring semantic similarity comprises:
      determining the adjacent node in the graph based on the adjacent node sharing an edge with the respective evaluation node;
      selecting one or more documents from the external corpus based on the selected documents being associated with the adjacent node;
      determining n-gram weights of a plurality of n-grams in text of the document corresponding to the adjacent node based on the weight of the edge linking the respective evaluation node to the adjacent node in the semantic graph; and
      determining one or more exogenous semantic similarity scores between the documents selected from the external corpus and the respective evaluation node, the exogenous semantic similarity scores being determined based on the determined n-gram weights and the presence of corresponding n-grams in the respective documents selected from the external corpus; and
   determining, by one or more processors, a measure of quality of at least some of the weighted edges of the semantic graph based on the exogenous semantic similarity scores.

2. The method of claim 1, wherein:
the weighted edges are arranged as a semantic similarity matrix having rows and columns corresponding to each of the documents and values corresponding to the edge weights, the semantic similarity matrix being a symmetric matrix;
an n-gram representation of the analyzed corpus is obtained and arranged as a first n-gram matrix comprising a plurality of vectors, each vector corresponding to one of the documents in the analyzed corpus, and each vector comprising a plurality of values indicating presence of a corresponding n-gram in the respective document;
an n-gram representation of selected documents from the external corpus is obtained and arranged as a second n-gram matrix comprising a plurality of vectors, each vector corresponding to one of the documents in the external corpus, and each vector comprising a plurality of values indicating presence of a corresponding n-gram in the respective document;
determining n-gram weights comprises:
   multiplying the first n-gram matrix, representing n-gram of the analyzed corpus, by the semantic similarity matrix to produce a third n-gram matrix comprising a plurality of vectors, each vector corresponding to a respective one of the documents in the analyzed corpus, and each vector comprising a plurality of values, the values being the determined n-gram weights, and the n-gram weights indicating a contribution of a corresponding n-gram to weights of edges to documents adjacent the respective document in the semantic graph;
selecting one or more documents from the external corpus that are associated with the adjacent node comprises:
   selecting vectors from the second n-gram matrix to represent the selected documents; and
scoring semantic similarity between documents in the analyzed corpus and documents in the external corpus selected as being associated with adjacent nodes to the respective evaluation node comprises:
   identifying a vector in the third n-gram matrix that both corresponds to the respective evaluation node; and
   determining similarity between the identified vector and the selected vectors from the second n-gram matrix based on angles between the vectors.

3. The method of claim 1, wherein:
the weighted edges are arranged as a semantic similarity matrix;
an n-gram representation of the analyzed corpus is obtained and encoded as a first n-gram matrix; and an n-gram representation of the one or more selected documents from the external corpus is obtained and encoded as a second n-gram matrix.

4. The method of claim 3, wherein determining n-gram weights comprises:
multiplying the first n-gram matrix by the semantic similarity matrix to produce a third n-gram matrix.

5. The method of claim 4, wherein scoring semantic similarity relative to the external corpus comprises:
selecting a vector in the third n-gram matrix and a vector in the second n-gram matrix; and
performing steps for determining similarity between the selected vectors.

6. The method of claim 1, wherein selecting one or more documents from the external corpus that are associated with the adjacent node comprises:
extracting an entity mentioned in the document corresponding to the adjacent node from the unstructured text of the document corresponding to the adjacent node;
selecting the one or more documents from the external corpus based on the extracted entity.

7. The method of claim 1, wherein selecting the one or more documents based on the extracted entity comprises:
accessing an index of topics of documents in the external corpus to identify a document about the entity; and
retrieving data indicative of n-grams of the document about the entity from a location indicated by the index.

8. The method of claim 1, wherein obtaining a weighted semantic graph comprises:
obtaining the analyzed corpus, the analyzed corpus comprising more than 5000 documents;
for each document in the analyzed corpus, with one or more processors:
determining a respective n-gram vector, each n-gram vector comprising a plurality of values each indicating presence of a respective n-gram in text of the respective document, wherein the n-gram vectors indicate at least 500 values and correspond to at least some n-grams including three words;
determining the scores indicating the amount of semantic similarity relative to the other documents in the analyzed corpus based on angles between the n-gram vector of the respective document and n-gram vectors of the other documents in the analyzed corpus.

9. The method of claim 8, comprising:
determining the edges based on which of the scores indicating the amount of semantic similarity satisfy a threshold.

10. The method of claim 1, comprising, for at least some of the evaluation nodes:
scoring semantic similarity relative to the external corpus by performing operations comprising:
determining a plurality of other adjacent nodes that are adjacent the respective evaluation node in the graph;
determining n-gram weights of a plurality of n-grams in the text of the documents corresponding to the other adjacent nodes based on the weight of the edge linking the respective evaluation node to the respective other adjacent node in the semantic graph;
selecting additional documents from the external corpus that are associated with at least some of the other adjacent nodes;
determining exogenous semantic similarity scores for other documents from the external corpus based on the determined n-gram weights and the presence of the corresponding n-grams in the selected other documents.

11. The method of claim 1, wherein:
determining n-gram weights of a plurality of n-grams in the text of the document corresponding to the adjacent node based on the weight of the edge linking the respective evaluation node to the adjacent node in the semantic graph comprises:
performing steps for determining n-gram weights of a plurality of n-grams in the text of the document;
selecting one or more documents from the external corpus based on the selected documents being associated with the adjacent node comprises:
performing steps for selecting one or more documents from the external corpus;
determining one or more exogenous semantic similarity scores between the documents selected from the external corpus and the respective evaluation node comprises:
performing steps for determining exogenous semantic similarity scores.

12. The method of claim 1, wherein determining a measure of quality of the weighted edges of the analyzed corpus based on the exogenous semantic similarity scores comprises:
ranking at least a plurality of documents in the analyzed corpus based on exogenous semantic similarity scores indicative of similarity relative to the selected documents from the external corpus; and
determining the measure of quality based on the ranking of a given document produced by documents selected from the external corpus that are associated with adjacent nodes of the given document.

13. The method of claim 1, comprising:
scoring semantic similarity of documents in the analyzed corpus to documents in the external corpus selected as being associated with non-adjacent nodes to the respective evaluation node, wherein the non-adjacent nodes are deemed to be in a cluster with the evaluation node.

14. The method of claim 1, wherein determining exogenous semantic similarity scores for documents in the external corpus based on the determined n-gram weights and the presence of the corresponding n-grams in the selected documents from the external corpus comprises:
normalizing values indicating presence of n-grams in the documents from the external corpus based on both frequency with which the respective n-gram occurs within a respective document and frequency with which the respective n-gram occurs in a corpus of documents.

15. The method of claim 1, comprising:
multiplying an n-gram matrix representing the occurrence of n-grams in documents in the analyzed corpus by a semantic similarity matrix of the edge weights by performing operations comprising:
obtaining a sparse matrix representation of the n-gram matrix in which vectors within the matrix are represented as respective indices identifying the locations on the respective vectors having non-zero values;
dividing the semantic similarity matrix into tiles, each tile comprising a plurality of adjacent values from a plurality of rows and a plurality of columns in the semantic similarity matrix; and
for each of at least a plurality of the tiles:
loading the respective tile from a first level of a memory hierarchy to a second level of a memory hierarchy that has faster access times for a processor that the first level of the memory hierarchy;
multiplying the respective tile by at least part of the n-gram matrix to produce a product; and
updating an existing value in a resultant matrix by adding the product to the existing value.

16. The method of claim 1, comprising:
determining that a given n-gram occurring in the external corpus or the analyzed corpus does not occur in at least part of the other corpus and, in response, discarding the given n-gram.

17. A system, comprising:
one or more processors;
memory storing instructions that when executed by at least some of the processors effectuate operations comprising:
    obtaining a weighted semantic graph of semantic similarity between unstructured text in documents within an analyzed corpus, wherein weights of the semantic graph are inferred by unsupervised learning of the weights by one or more computers, and wherein the semantic graph comprises:
        more than 1000 nodes, each corresponding to at least one respective document within the analyzed corpus; and
        more than 2000 weighted edges, each weighted edge linking two of the nodes and having a score indicating an amount of semantic similarity between documents corresponding to the two linked nodes;
    obtaining access to an external corpus having at least some other documents with unstructured text about entities mentioned in the analyzed corpus, the other documents not being within the analyzed corpus;
    for each of at least 20 evaluation nodes among the nodes of the graph, by one or more processors, scoring semantic similarity between documents in the analyzed corpus and documents in the external corpus selected as being associated with adjacent nodes to the respective evaluation node, wherein scoring semantic similarity comprises:
        determining the adjacent node in the graph based on the adjacent node sharing an edge with the respective evaluation node;
        selecting one or more documents from the external corpus based on the selected documents being associated with the adjacent node;
        determining n-gram weights of a plurality of n-grams in text of the document corresponding to the adjacent node based on the weight of the edge linking the respective evaluation node to the adjacent node in the semantic graph; and
        determining one or more exogenous semantic similarity scores between the documents selected from the external corpus and the respective evaluation node, the exogenous semantic similarity scores being determined based on the determined n-gram weights and the presence of corresponding n-grams in the respective documents selected from the external corpus; and
    determining, by one or more processors, a measure of quality of at least some of the weighted edges of the semantic graph based on the exogenous semantic similarity scores.

18. The system of claim 17, wherein:
the weighted edges are arranged as a semantic similarity matrix having rows and columns corresponding to each of the documents and values corresponding to the edge weights, the semantic similarity matrix being a symmetric matrix;
an n-gram representation of the analyzed corpus is obtained and arranged as a first n-gram matrix comprising a plurality of vectors, each vector corresponding to one of the documents in the analyzed corpus, and each vector comprising a plurality of values indicating presence of a corresponding n-gram in the respective document;
an n-gram representation of selected documents from the external corpus is obtained and arranged as a second n-gram matrix comprising a plurality of vectors, each vector corresponding to one of the documents in the external corpus, and each vector comprising a plurality of values indicating presence of a corresponding n-gram in the respective document;
determining n-gram weights comprises:
    multiplying the first n-gram matrix, representing n-gram of the analyzed corpus, by the semantic similarity matrix to produce a third n-gram matrix comprising a plurality of vectors, each vector corresponding to a respective one of the documents in the analyzed corpus, and each vector comprising a plurality of values, the values being the determined n-gram weights, and the n-gram weights indicating a contribution of a corresponding n-gram to weights of edges to documents adjacent the respective document in the semantic graph;
selecting one or more documents from the external corpus that are associated with the adjacent node comprises:
    selecting vectors from the second n-gram matrix to represent the selected documents; and
scoring semantic similarity between documents in the analyzed corpus and documents in the external corpus selected as being associated with adjacent nodes to the respective evaluation node comprises:
    identifying a vector in the third n-gram matrix that both corresponds to the respective evaluation node; and
    determining similarity between the identified vector and the selected vectors from the second n-gram matrix based on angles between the vectors.

19. The system of claim 17, wherein:
the weighted edges are arranged as a semantic similarity matrix;
an n-gram representation of the analyzed corpus is obtained and encoded as a first n-gram matrix; and
an n-gram representation of the one or more selected documents from the external corpus is obtained and encoded as a second n-gram matrix.

20. The system of claim 19, wherein determining n-gram weights comprises:
multiplying the first n-gram matrix by the semantic similarity matrix to produce a third n-gram matrix.

21. The system of claim 20, wherein scoring semantic similarity relative to the external corpus comprises:
selecting a vector in the third n-gram matrix and a vector in the second n-gram matrix; and
performing steps for determining similarity between the selected vectors.

22. The system of claim 17, wherein selecting one or more documents from the external corpus that are associated with the adjacent node comprises:
extracting an entity mentioned in the document corresponding to the adjacent node from the unstructured text of the document corresponding to the adjacent node;

selecting the one or more documents from the external corpus based on the extracted entity.

23. The system of claim 17, wherein selecting the one or more documents based on the extracted entity comprises:
accessing an index of topics of documents in the external corpus to identify a document about the entity; and
retrieving data indicative of n-grams of the document about the entity from a location indicated by the index.

24. The system of claim 17, wherein obtaining a weighted semantic graph comprises:
obtaining the analyzed corpus, the analyzed corpus comprising more than 5000 documents;
for each document in the analyzed corpus, with one or more processors:
determining a respective n-gram vector, each n-gram vector comprising a plurality of values each indicating presence of a respective n-gram in text of the respective document, wherein the n-gram vectors indicate at least 500 values and correspond to at least some n-grams including three words;
determining the scores indicating the amount of semantic similarity relative to the other documents in the analyzed corpus based on angles between the n-gram vector of the respective document and n-gram vectors of the other documents in the analyzed corpus.

25. The system of claim 24, the operations comprising:
determining the edges based on which of the scores indicating the amount of semantic similarity satisfy a threshold.

26. The system of claim 17, the operations comprising, for at least some of the evaluation nodes:
scoring semantic similarity relative to the external corpus by performing operations comprising:
determining a plurality of other adjacent nodes that are adjacent the respective evaluation node in the graph;
determining n-gram weights of a plurality of n-grams in the text of the documents corresponding to the other adjacent nodes based on the weight of the edge linking the respective evaluation node to the respective other adjacent node in the semantic graph;
selecting additional documents from the external corpus that are associated with at least some of the other adjacent nodes;
determining exogenous semantic similarity scores for other documents from the external corpus based on the determined n-gram weights and the presence of the corresponding n-grams in the selected other documents.

27. The system of claim 17, wherein:
determining n-gram weights of a plurality of n-grams in the text of the document corresponding to the adjacent node based on the weight of the edge linking the respective evaluation node to the adjacent node in the semantic graph comprises:
performing steps for determining n-gram weights of a plurality of n-grams in the text of the document;
selecting one or more documents from the external corpus based on the selected documents being associated with the adjacent node comprises:
performing steps for selecting one or more documents from the external corpus;
determining one or more exogenous semantic similarity scores between the documents selected from the external corpus and the respective evaluation node comprises:
performing steps for determining exogenous semantic similarity scores.

28. The system of claim 17, wherein determining a measure of quality of the weighted edges of the analyzed corpus based on the exogenous semantic similarity scores comprises:
ranking at least a plurality of documents in the analyzed corpus based on exogenous semantic similarity scores indicative of similarity relative to the selected documents from the external corpus; and
determining the measure of quality based on the ranking of a given document produced by documents selected from the external corpus that are associated with adjacent nodes of the given document.

29. The system of claim 17, the operations comprising:
scoring semantic similarity of documents in the analyzed corpus to documents in the external corpus selected as being associated with non-adjacent nodes to the respective evaluation node, wherein the non-adjacent nodes are deemed to be in a cluster with the evaluation node.

30. The system of claim 17, wherein determining exogenous semantic similarity scores for documents in the external corpus based on the determined n-gram weights and the presence of the corresponding n-grams in the selected documents from the external corpus comprises:
normalizing values indicating presence of n-grams in the documents from the external corpus based on both frequency with which the respective n-gram occurs within a respective document and frequency with which the respective n-gram occurs in a corpus of documents.

31. The system of claim 17, the operations comprising:
multiplying an n-gram matrix representing the occurrence of n-grams in documents in the analyzed corpus by a semantic similarity matrix of the edge weights by performing operations comprising:
obtaining a sparse matrix representation of the n-gram matrix in which vectors within the matrix are represented as respective indices identifying the locations on the respective vectors having non-zero values;
dividing the semantic similarity matrix into tiles, each tile comprising a plurality of adjacent values from a plurality of rows and a plurality of columns in the semantic similarity matrix; and
for each of at least a plurality of the tiles:
loading the respective tile from a first level of a memory hierarchy to a second level of a memory hierarchy that has faster access times for a processor that the first level of the memory hierarchy;
multiplying the respective tile by at least part of the n-gram matrix to produce a product; and
updating an existing value in a resultant matrix by adding the product to the existing value.

32. The system of claim 17, the operations comprising:
determining that a given n-gram occurring in the external corpus or the analyzed corpus does not occur in at least part of the other corpus and, in response, discarding the given n-gram.

\* \* \* \* \*